(12) United States Patent
Dawson et al.

(10) Patent No.: US 8,453,234 B2
(45) Date of Patent: May 28, 2013

(54) CENTRALIZED SECURITY MANAGEMENT SYSTEM

(75) Inventors: Travis E. Dawson, San Francisco, CA (US); Jing J. Yea, Hillsborough, CA (US); John N. Larson, Belmont, CA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1594 days.

(21) Appl. No.: 11/533,586

(22) Filed: Sep. 20, 2006

(65) Prior Publication Data

US 2008/0127337 A1   May 29, 2008

(51) Int. Cl.
*G06F 11/00* (2006.01)

(52) U.S. Cl.
USPC .................. 726/22; 726/23; 726/25; 713/188

(58) Field of Classification Search
USPC ...................................... 726/22–25
See application file for complete search history.

(56) References Cited

U.S. PATENT DOCUMENTS

| | | | |
|---|---|---|---|
| 6,324,647 B1 | 11/2001 | Bowman-Amuah | |
| 7,058,796 B2 | 6/2006 | Lynn et al. | |
| 7,418,733 B2 * | 8/2008 | Connary et al. | 726/25 |
| 8,136,162 B2 * | 3/2012 | Akyol et al. | 726/24 |
| 2002/0178383 A1 * | 11/2002 | Hrabik et al. | 713/201 |
| 2003/0236990 A1 * | 12/2003 | Hrastar et al. | 713/200 |
| 2004/0034794 A1 * | 2/2004 | Mayer et al. | 713/200 |
| 2004/0098610 A1 | 5/2004 | Hrastar | |
| 2005/0071644 A1 * | 3/2005 | Moghe et al. | 713/182 |
| 2006/0129810 A1 * | 6/2006 | Jeong et al. | 713/166 |
| 2008/0098454 A1 * | 4/2008 | Toh | 726/1 |
| 2012/0137362 A1 * | 5/2012 | Amaya Calvo et al. | 726/22 |

OTHER PUBLICATIONS

International Search Report with Written Opinion dated Feb. 27, 2008.

* cited by examiner

*Primary Examiner* — Amare F Tabor
(74) *Attorney, Agent, or Firm* — Shook, Hardy & Bacon L.L.P.

(57) ABSTRACT

A centralized security management system (CSMS) is provided to monitor a network to detect and mitigate attacks in or to the network. The CSMS includes a variety of devices located throughout the network to collect and synthesize data collected or obtained from devices operating in the network. The collected data is analyzed using behavioral engines or other software algorithms to develop trends for a normal and abnormal operating condition. The abnormal operating conditions are analyzed further to determine attacks to the devices or the network. Based on the attacks, a mitigation scheme is implemented to remove or reduce the attacks.

18 Claims, 4 Drawing Sheets

CENTRALIZED SECURITY MANAGEMENT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND 4G technology is the next generation wireless technology after 3G. 4G technology encompasses many of the features of WiMax which is the IEEE 802.16 standard for wireless broadband. Many manufacturers are currently developing and testing equipment to support and deploy 4G. As 4G brings more advanced technology, features, bandwidth, and services, to the wireless environment, more destructive behavior like attacks on the network or devices in the network will be encountered.

Today, various types of attacks on the network or devices can be seen. These attacks can range from bombarding a device with malicious data packets to sending intermittent data packets to a device to cause a battery drain. As different types of attacks are created, manufacturers and service providers work feverishly to try to thwart the attacks. This may be reflected in the creation of devices that can detect or mitigate attacks from malicious packets. This can also be seen in the creation of network solutions that monitor a network for certain types of packets. However, not all types of malicious data packets are detectable. Some of the most difficult detection occurs from perceived abnormal operating conditions. What might tend to be an abnormal situation with a device might prove to be a malicious denial of service situation. Manufacturers and service providers are helpless to defend against this type of behavior without having additional resources in the network and having knowledge about the operating environment of the network to be protected.

The problem with denial of service attacks becomes more acute when a wireless environment is involved. Not only does a service provider have to know how to detect, reduce, and remove the malicious packet over a packet network like the Internet, the service provider has to know how to perform the mitigation with wireless devices. The service provider has to know how to detect and mitigate over various wireless technologies including wireless broadband. Furthermore, the impact of wireless technologies means that more devices are susceptible to becoming malicious devices. Whereas in a wire line network, a computing device is the main target of an attack. In a wireless environment, many more devices are prone to attack and are prone to be attackers. Such devices can include mobile telephones, wirelessly connected computing devices, and PDAs to name a few.

With all of the issues discussed above, service providers have to be concerned with implementing 4G and other networks that can allow for a variety of detection of malicious activity especially across different devices in a network and across different technologies. The service providers have to implement a scheme for mitigating the malicious activity especially for threats which were previously difficult or impossible to detect.

SUMMARY

The present invention is defined by the claims below. Embodiments of the present invention solve at least the above problems by providing a system, method, and media for, among other things, a centralized security management system.

In a first aspect, computer-readable media having computer-readable code for performing a method for operating a centralized security management system is provided that includes collecting data from devices in a network. A baseline operation is determined for the devices and the network. The baseline operation includes performing a correlation of the data. The baseline operation is modified based on a change in the collected data. An anomaly condition to the baseline operation or the modified baseline operation is identified. The anomaly condition is determined whether it is an attack on a member of the devices or the network.

In another aspect, a centralized security management system is provided that includes computing devices operable in networks. A first subset of the computing devices operates to perform analyses and correlations of data collected by a second subset of the computing devices. The second subset of the computing devices operates to collect the data from devices located or operating in the networks. A third subset of the computing devices operates to either or both control the computing devices, monitor the computing devices and the devices, provide a first view of the computing devices to users, or provide a second view of the devices to the users.

In yet another aspect, a computer system having a processor and a memory to execute a method for providing a centralized security management system is provided that includes communicating with network elements located in networks. A subset of the network elements are monitored on a periodic basis. Event information is collected from the network elements. Correlations are performed with the collected event information to determine operating conditions for the network elements. From the operating conditions, abnormal operating conditions are identified for a member of the network elements. A threat of attack or an attack is determined from the identified abnormal operating conditions.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems, methods, and media for a centralized security management system.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

- 3G Third generation wireless network
- 4G Fourth generation wireless network
- AAA Authentication, Authorization, and Accounting
- AH Authentication Header
- BLUETOOTH Technology for connecting devices using a short-ranged wireless connection.
- CDMA Code Division Multiple Access
- CLI Command Line Interface
- COA Care-of-Address
- CSV Comma-Separated Value
- EDGE Enhance Data Rates for GSM (and TDMA) Evolution
- ESP Encapsulating Security Payload
- EV-DO Evolution Data Only or Evolution Data Optimized
- GPRS General Packet Radio Services
- GSM Global System for Mobile Communications
- GUI Graphical User Interface
- HTML HyperText Markup Language
- HTTP HyperText Transfer Protocol
- HTTPS Secure HyperText Transfer Protocol
- IETF Internet Engineering Task Force
- IMS IP Multimedia Subsystem
- IP Internet Protocol
- IPsec IP Security
- IPv4 Internet Protocol Version 4
- IPv6 Internet Protocol Version 6
- MIPv4 Mobile Internet Protocol Version 4
- MIPv6 Mobile Internet Protocol Version 6
- OSI Open Systems Interconnection
- PDA Personal Digital Assistant
- PDF Portable Document Format
- RADIUS Remote Authentication Dial In User Service
- SNMP Simple Network Management Protocol
- SOAP Simple Object Access Protocol
- SSH Secure Shell
- TACACS Terminal Access Controller Access-Control System
- UMTS Universal Mobile Telephone System
- W-CDMA Wide Code Division Multiple Access
- WiFi Wireless Fidelity (802.11 network)
- WiMAX Worldwide Interoperability for Wireless Access (802.16 network)
- XML Extensible Markup Language
- XML-RPC Extensible Markup Language—Remote Procedure Calling
- ZIGBEE Technology for connecting devices using a short-ranged wireless connection.

Further, various technical terms are used throughout this description. A definition of such terms can be found in *Newton's Telecom Dictionary* by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Centralized Security Management System

The present invention implements a centralized security management system in a 4G wireless broadband environment to detect malicious data packets and activity. Based on the detection, the system mitigates the malicious data packets and activity using various techniques that depend on the type of packets or activity encountered, the type of devices involved, and the location in the network where the problems are occurring. Although much of the present invention will be explained using 4G technology as an example, various embodiments of the present invention may be implemented using other technologies.

Figure 1:
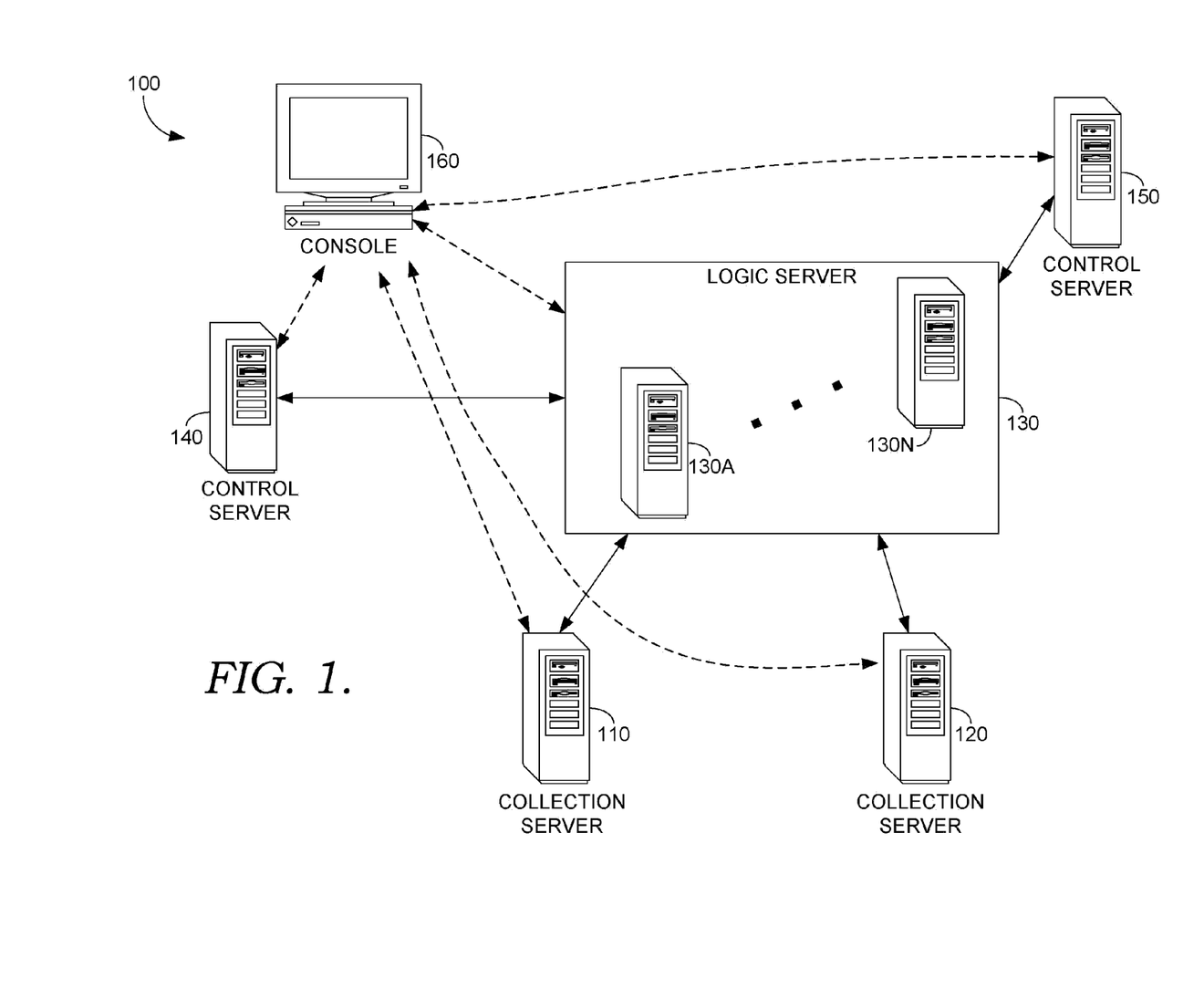
FIG. 1 is a block diagram of an exemplary centralized security management system implemented in an embodiment of the present invention.

In FIG. 1, an exemplary centralized security management system 100 is illustrated with collection servers 110 and 120 connected to logic server 130. Logic server 130 is connected to control servers 140 and 150. Collection servers 110 and 120, logic server 130, and control servers 140 and 150 are connected to console 160.

Collection servers 110 and 120 are illustrated in FIG. 1 to show that multiple servers may be implemented in the centralized security management system for the collection of data. Although two servers are shown for collection, other embodiments of the present invention may show additional collection servers. The number of collection servers depends on several factors including the size of the network, the amount of data to be collected, the availability of resources, and the location of the servers in the network.

Collection servers perform the task of actively or passively collecting information about various devices in the network. The collection servers can get this information in several ways. In one way, the collection servers may poll the devices to obtain the information. In another way, the devices may send the information to the collection servers. In an embodiment of the present invention, the collection servers may receive information from all of the devices located in the network, from a selection of devices in the network, or from devices outside of the network. The approach of whether the collection is based on the collection servers polling the devices or receiving the information from the devices depend on the implementation. Both approaches may be implemented and can be streamlined so that the collection servers are not bombarded with too much information or unnecessary information. For example, if a collection server gets information from a firewall and a router, the collection server may be configured to receive information from the router but may periodically poll the firewall. Again, the implementation of the collection servers depends on the implementation of the embodiment of the present invention.

Collection servers 110 and 120 may perform some type of analysis. This can be an important step if the amount of information received by the collection servers is voluminous. The collection servers can pre-process a subset or all of the information before sending it or sending results to other devices or servers in the centralized security management system. The analysis may also cause the collection servers to collect additional information, especially if a particular event occurs.

Although shown as independent devices, collection servers 110 and 120 can be integrated into other devices or servers. For example, collection servers 110 and 120 could be integrated into logic server 130 or integrated into control servers 140 and 150. The actual implementation of the embodiment of the present invention will depend on a variety of factors including resource availability, size, and load.

Collection servers 110 and 120 can be implemented with various connections to accept a variety of inputs. For example, collection servers 110 and 120 may accept SYSLOG event data and SNMP Trap event data. An SNMP Trap is used to send information to the collection servers. Collection servers 110 and 120 may retrieve event data with SNMP Get requests, with external scripts such as "expect" or "ssh", with protocols such as SOAP, XML-RPC, or NETCONF, or with an interface to AAA servers including RADIUS, TACACS+, and DIAMETER. An SNMP Get request is used to query for information in an element or a device. "Expect" is a tool used to automate tasks, and "Ssh" is a secure shell. SOAP is a protocol for exchanging XML-based messages over a network. XML-RPC is a remote procedure call protocol which uses XML to encode its calls, and HTTP as a transport mechanism. NETCONF is a network management protocol under the IETF. Collection servers 110 and 120 may accept or retrieve data without a significant performance degradation of the elements or devices.

Logic server 130 is illustrated to show multiple logic servers 130A to 130N. Logic server 130 provides the analysis and correlation functions within the centralized security management system. Logic server 130 can also cause the collection servers to collect additional information. An implementer may implement a number of logic servers depending on the similar impacts discussed for the collection servers. The functions of the logic server may be integrated with other servers or functions.

Logic server 130 receives information from the collection servers. With the information, logic server 130 performs correlations of events across devices in the network. The logic server can correlate disparate events from different devices to obtain an understanding within the network. By combining event data from different or similar devices in the network, logic server 130 can detect a scan of the network.

The logic server may be implemented to take data from multiple unrelated sources in different formats and normalize it into a usable context. The logic server may perform correlations of events across multiple technologies. The logic server may correlate disparate events from different technologies to gain an understanding of events within the network. For example, by combining event data from devices such as a router, a firewall, or another system, the centralized security management system may detect an attack against the network.

The logic server may be implemented to perform correlations on information related to each of the layers in an OSI 7-layer model. It may be implemented to perform correlations of events across time. The logic server may correlate events from different times to obtain an understanding of the network. For example, collecting data from different time periods may allow detection at a low rate.

The logic server may perform correlations of events using behavior and profile modeling, and expert systems and signatures. The logic server may correlate events and compare them to a profile or behavior. The logic server may also correlate events and compare them to known signatures. For example, the logic server may combine event data to detect when devices are infected with new, unknown, or known worms or virii.

The identification and removal of attacks related to signatures is a strong concern of service providers and may be implemented in an embodiment of the present invention. Signatures may be described into three categories for the discussion here, packet/flow signatures, behavioral signatures, and alert signatures. It may be noted that other signatures are possible although the discussion is limited to the three here.

Packet or flow signatures are known as "bad" packets or "flows" of packets. An example of these types of packets are the TCP SYN packets. For example, a TCP SYN attack involves a sender transmitting a volume of connections that cannot be completed. This causes the connection queues to fill up, thereby denying service to legitimate TCP users.

Behavioral signatures deal with known behavior patterns. For example, a pattern of behavior may denote valid actions for a network or a set of devices. But if a certain pattern is received that is indicative of a "bad" behavior, the system or logic server can identify it immediately as being bad. This can happen in the case of a worm where behavioral patterns of worms are already known. One example is where there are connections with other hosts in a certain way, maybe sending email after being port scanned because something became a spam zombie.

Alert signatures pertain to receipt of information from devices or network elements. Basically, if an alert is received from a device or devices, then a particular action is taken.

Overall, signatures may be handled outside of the normal channels. Since information is already known or identified, mitigation strategies can be quickly implemented without taking up processing time in the logic server to learn about or train on the situation. Depending on the implementation of the embodiment, the logic server may or may not be involved to perform the analysis and correlation process. More importantly, time may be reduced in resolving attacks involving signatures by implementing mitigation solutions when they immediately occur. The quicker an attack can be removed or reduced, the better more devices and the network will not be impacted.

The logic server can be especially useful in the wireless environment. The logic server may detect wireless specific attacks directed at both mobile endpoints such as mobile telephones and the network infrastructure. It may detect mobility specific attacks including verification of home address or care-of-address to prevent attacks on MIPv6 route optimization. It may detect attacks against return-routability protocol used to overcome verification of CoA. It may detect attacks to prevent reflection and amplification attacks. It may detect attacks to avoid unnecessary authentication of binding updates.

The logic server may be implemented to detect attacks from other systems such as IMS. The logic server can be implemented to be IMS aware as well as IPv6, IPv4, MIPv6, and MIPv4 aware. The logic server may be able to detect IPv6 attacks.

As well as the aspects of detection, the logic server may detect and support the mitigation of wireless paging channel or control channel attacks. It may detect and support the mitigation of wireless battery draining attacks. It may support AH and ESP in IPv6 implementations for detection and mitigation.

Control servers 140 and 150, similar to collection servers 110 and 120, may include various numbers of control servers, although only two are shown in FIG. 1. Control server 140 and 150 mitigate threats within the network. Control servers 140 and 150 may be integrated with other servers or implemented as standalone devices as shown in FIG. 1.

The control servers can control and monitor devices using scripts as discussed above, using protocols such as SOAP and NETCONF, and using SNMP Set messages. The control servers may also access and modify AAA records. The control servers' ability to manipulate devices and information stem from the information and instructions received from logic server 130 and console 160.

Console 160 interfaces with the devices in the centralized security management system as illustrated in FIG. 1. Console 160 provides an interface for a user to interact with the various devices to manipulate data that is received by the system, to monitor events, to perform analyses, and to provide mitigation to troublesome areas or devices in the network. The console is the point of control and view for the user over the centralized security management system as a whole. The console, like the servers, may be integrated into the servers and not implemented as a standalone device as depicted in FIG. 1.

Console 160 may perform data to day duties such as monitoring, administration, and management with a secure web-based GUI or a CLI-based GUI. The console may manage the devices within the centralized security management systems using secured methods such as SSH, HTTPS, and IPsec to name a few. It may also manage the devices with different levels of access ranging from read-only to super user. Although console 160 is described in terms of the console performing a function, it is more appropriate to state that a user may operate console 160 to perform some of the functions described above.

With the servers operating together in the centralized security management system, various outputs may be created for raw and correlated events. The output may be in a SYSLOG format, an SNMP Trap format, text formats like CSV and HTML, or finished formats like Microsoft WORD and Adobe PDF. Various reports may be generated in text format or finished format. Reports may be generated on a per customer basis, a per IP-block basis, an overall basis, or an ad-hoc basis.

Figure 2:
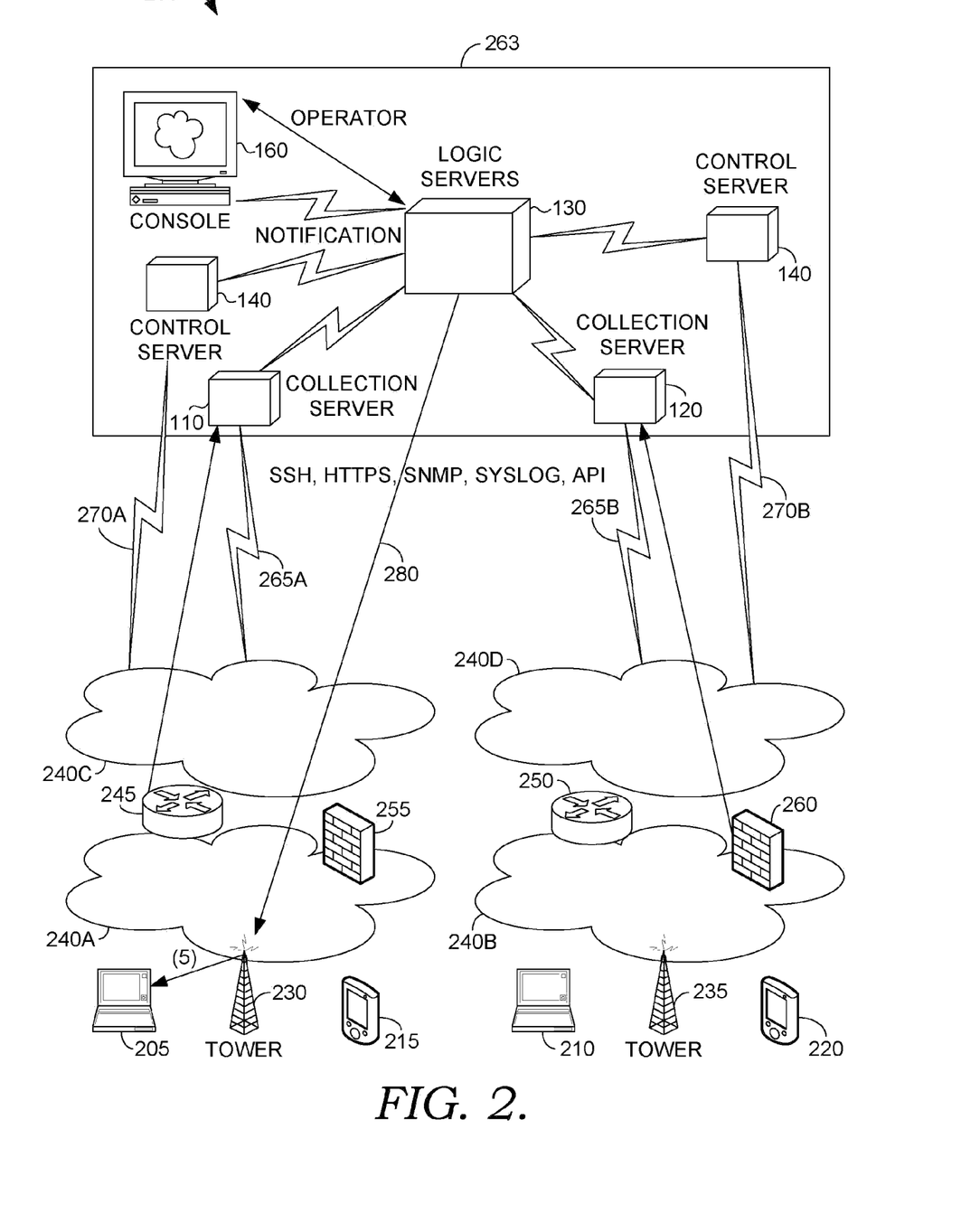
FIG. 2 is a block diagram of an exemplary operating environment with a centralized security management system in an embodiment of the present invention.

Turning now to FIG. 2, a scenario may described to illustrate an exemplary operating environment for the centralized security management system (CSMS) 263. In the scenario, a worm has infected computing device 205. The worm attacks from computing device 205 other devices in the network including mobile devices. In the scenario, CSMS 263 operates to remove or reduce the attacks initiated by the worm. A router 245 and a firewall 260 send their event information to collection servers 110 and 120 in CSMS 263. Collection servers 110 and 120 take the event information and correlates it with other information to produce an alert. Although the singular form "event information" is used, it is also used to denote plural information as well. An operator at console 160 is notified and possible mitigation actions are provided at console 160. The operator chooses the appropriate action to take. A control channel 280 is opened to tower 230 which is currently where computing device 205 is connected. A command is given to deny all traffic from computing device 205. Computing device 205 is effectively removed from the network.

In another scenario to illustrate an exemplary operating environment for CSMS 263, a zero day worm (with no known signature) has infected computing device 205, and is in the process of propagating to many other mobile devices. In the scenario, CSMS 263 operates to detect and remove or reduce the attacks initiated by the worm. A router 245 and a firewall 260 send their event information to collection servers 110 and 120 in CSMS 263. Collection servers 110 and 120 take the event information and pass it on to logic server 130. The logic server detects an anomalous traffic event requiring additional monitoring detail. Control server 140 sends a request for additional detailed monitoring from router 245 and firewall 260 along with other relevant servers in the network. These servers send the more detailed information to collection servers 110 and 120, which passes this information to logic server 130. With this more detailed information, the logic server correlates the information with other information to identify all of the infected mobile devices and produce appropriate operator alerts and mitigation recommendations. Again, although the singular form "event information" is used, it is also used to denote plural information. An operator at console 160 is notified and possible mitigation actions are provided at console 160. The operator chooses the appropriate action to take. A control channel 280 is opened to tower 230 which is currently where computing device 205 is connected. A command is given to deny all traffic from computing device 205. Computing device 205 is effectively removed from the network. Similar actions are performed to remove all other infected mobile devices from the network. Advanced semi-automated mitigation mechanisms may be included to provide more rapid mitigation capabilities for this type of scenario.

Figure 3:
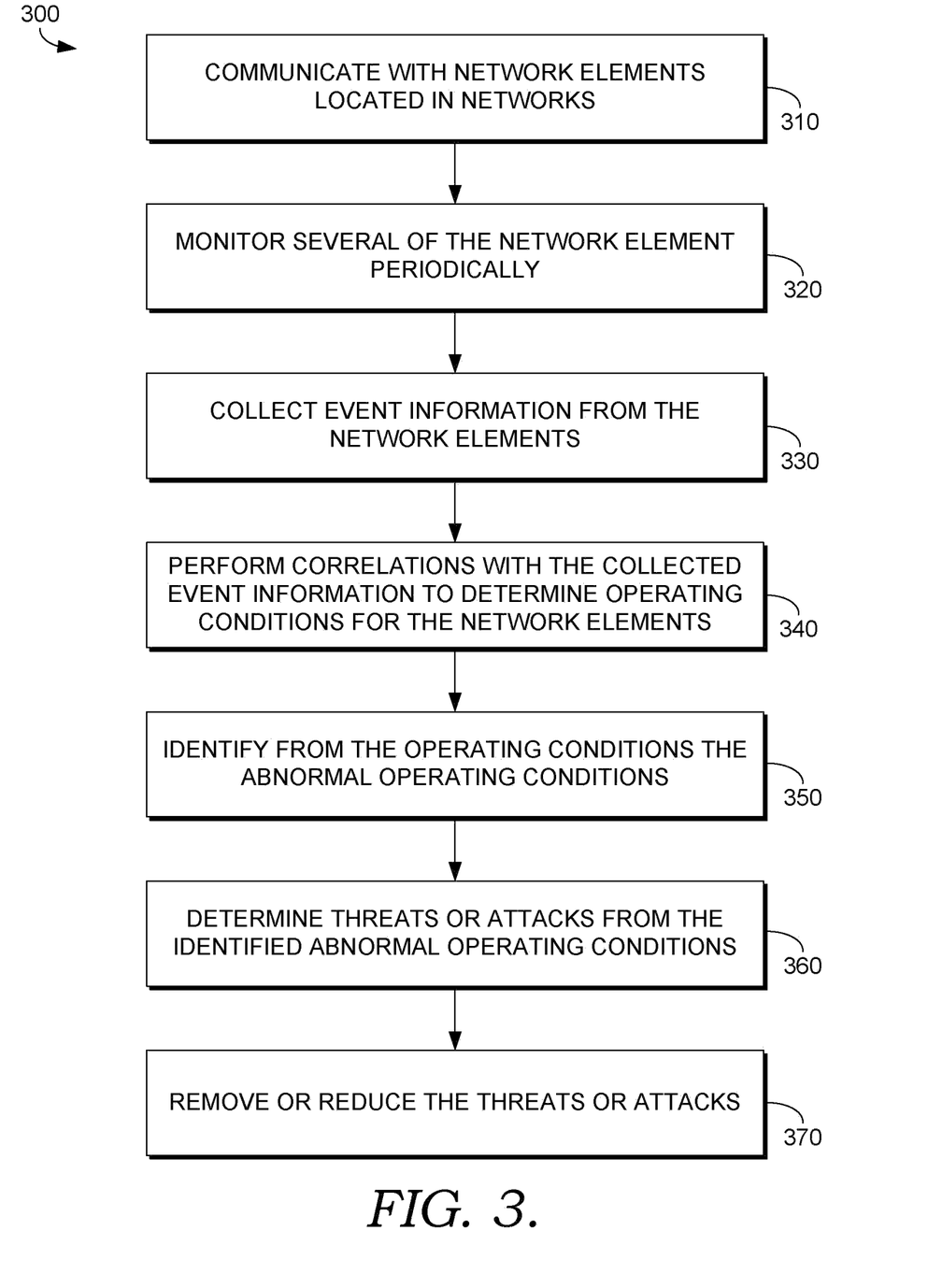
FIG. 3 is a flowchart of an exemplary process for operating a centralized security management system in an embodiment of the present invention.

In FIG. 3, a process for operating a centralized security management system 100 and 263 is provided in a method 300. In a step 310, CSMS 100 and 263 communicate with network elements located in networks. Network elements may include all types of devices including end-user devices and devices in another's network. In a step 320, several of the network elements are monitored periodically. In a step 330, event information is collected from the network elements by collection servers 110 and 120. In a step 340, correlations are performed at logic server 130 with the collected event information to determine operating conditions for the network elements. In steps 350 and 360, logic server 130 identifies abnormal operating conditions from the operating conditions and determines threats or attacks from the identified abnormal operating conditions. In a step 370, control servers 140 and 150 remove or reduce the threats or attacks with the support of the other servers.

Figure 4:
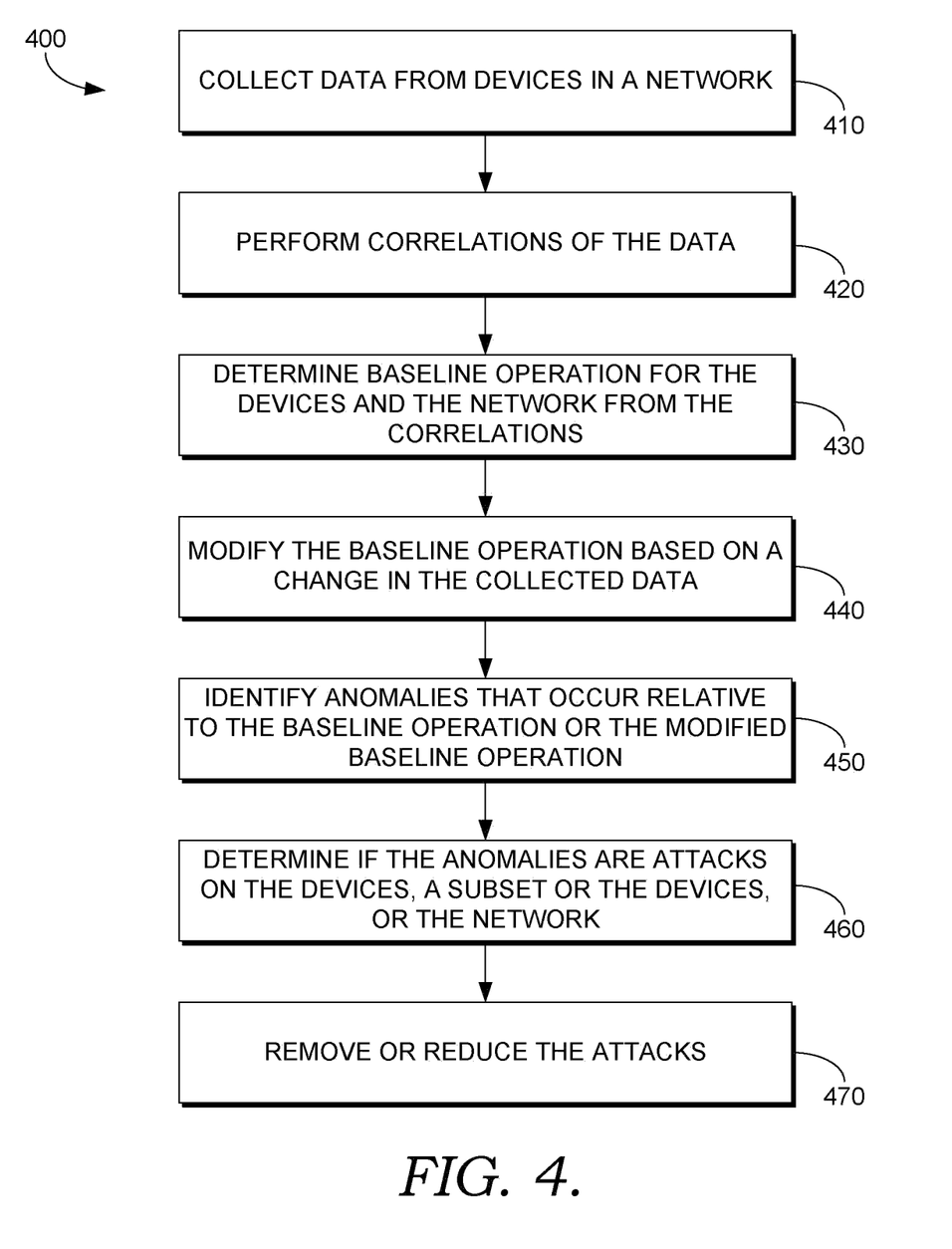
FIG. 4 is a flowchart of another exemplary process for operating a centralized security management system in an embodiment of the present invention.

Turning now to FIG. 4, another process for operating a centralized security management system 100 and 263 is provided in a method 400. In a step 410, data is collected at collection servers 110 and 120 from devices operating in a network. The data or results are transferred to logic server 130. In a step 420, logic server 130 performs correlations on the data to develop trends and understandings about the operating conditions of the devices and the network. In a step 430, logic server 130 creates a baseline operation for the devices and the network from the correlations. The baseline operation represents a normal operation condition which may fluctuate over time or due to certain impacts on the network. As a result, in a step 440, logic server 130 may modify the baseline operation based on a changed in the collected data coming from collection servers 110 and 120.

In a step 450, logic server 130 identifies anomalies that occur relative to the baseline operation or the modified baseline operation. In a step 460, logic server 130 determines if the anomalies are attacks on the devices as a whole, a subset of the devices, or the network. In a step 470, control servers 140 and 150 remove or reduce the attacks. Although not discussed in the steps in FIGS. 3-4, console 160 and a corresponding operator interact with the servers to accomplish the detection and mitigation of problems.

The prior discussion is only for illustrative purposes to convey exemplary embodiments. The steps discussed in FIGS. 3-4 may be executed without regards to order. Some steps may be omitted and some steps may be executed at a different time than shown. For example, step 330 may be executed before step 320. Step 450 may be executed before step 440. The point here is to convey that the figures are merely exemplary for the embodiments of the present invention and that other embodiments may be implemented for the present invention.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer-readable storage devices having thereon computer-readable code for performing a method for operating a centralized security management system, comprising:
   collecting a plurality of data from a set of devices in a network;
   determining each of a first baseline operation for each of the set of devices wherein determining the first baseline operation includes correlating the plurality of data from disparate events in each device and identifying a normal operating condition for each device;
   determining a second baseline operation for the network wherein determining the second baseline operation includes identifying the normal operating condition for the network and at least one of correlating the plurality of data from different times and correlating the plurality of data from disparate events across different devices;
   modifying the first baseline operation or the second baseline operation based on a change in the collected plurality of data; and
   identifying an anomaly condition to the first baseline operation, the second baseline operation, the modified first baseline operation, or the modified second baseline operation, further comprising determining if the anomaly condition is an attack on a member of the set of devices or the network;
   wherein determining each of the first baseline operation comprises operating a behavioral engine that learns or trains to identify the normal operating condition for each of the set of devices;
   wherein determining the second baseline operation comprises operating the behavioral engine that learns or trains to identify the normal operating condition for the network.

2. The one or more computer-readable storage devices of claim 1, further comprising at least one of removing the attack and reducing the attack.

3. The one or more computer-readable storage devices of claim 2, wherein removing the attack comprises locating an origin of the attack.

4. The one or more computer-readable storage devices of claim 2, wherein reducing the attack comprises locating an origin of the attack.

5. The one or more computer-readable storage devices of claim 2, further comprising analyzing the plurality of data for one or more events further comprising collecting an additional plurality of data based on the analysis.

6. The one or more computer-readable storage devices of claim 2, wherein collecting the plurality of data comprises identifying one or more events in the network and collecting the plurality of data based on the one or more events.

7. The one or more computer-readable storage devices of claim 2, wherein determining the baseline operation comprises operating at least one of an anomaly process, a behavioral process, and a signature process to exclude the anomaly condition.

8. The one or more computer-readable storage devices of claim 2, wherein identifying the anomaly condition comprises operating at least one of an anomaly process, a behavioral process, and a signature process to identify the anomaly condition.

9. The one or more computer-readable storage devices of claim 2, further comprising:
   identifying at least one of a packet signature, a flow signature, a behavioral signature, and an alert signature;
   omitting an identification step for the anomaly condition; and
   removing the attack or reducing the attack related to the at least one of the packet signature, the flow signature, the behavioral signature, and the alert signature.

10. A computer system having a processor and a memory, the computer system operable to execute a method for providing a centralized security management system, comprising:
   communicating with a first set of network elements located in one or more networks wherein communicating with the first set comprises monitoring a subset of the first set on a periodic basis;
   collecting a second set of event information from the first set of network elements;
   correlating the collected second set of event information to determine one or more operating conditions for the first set of network elements wherein the collected set of event information comes from at least one of disparate events or different times;
   determining the one or more operating conditions for the first set of network elements wherein determining the one or more operating conditions comprises operating a behavioral engine that learns or trains to identify a normal operating condition for the first set of network elements;

identifying from the one or more operating conditions one or more abnormal operating conditions of a member of the first set; and determining a threat of attack or an attack from the identified one or more abnormal operating conditions.

11. The system of claim 10, further comprising mitigating the threat of attack or the attack.

12. The system of claim 11, wherein determining the threat of attack or the attack comprises determining the threat of attack or the attack from the member, to another member, or to the one or more networks.

13. The system of claim 12, wherein collecting the second set of event information comprises at least one of obtaining the second set of event information from the first set of network elements, polling the first set of network elements, and receiving the second set of event information from the first set of network elements.

14. The system of claim 12, wherein determining the threat of attack or the attack comprises determining a wireless threat or a wireless attack.

15. The system of claim 12, wherein mitigating the threat of attack or the attack comprises at least one of removing one or more members of the first set and blocking a data transmission of the one or more members of the first set.

16. The system of claim 10, further comprising analyzing the second set of event information and collecting an additional second set of event information based on the analysis.

17. The system of claim 10, wherein collecting the second set of event information comprises identifying the second set of event information in the one or more networks and collecting the second set of event information based on one or more events.

18. The system of claim 10, further comprising:
identifying at least one of a packet signature, a flow signature, a behavioral signature, and an alert signature;
omitting the performance step, the identification step, and the determination step; and
removing the attack or reducing the attack related to the at least one of the packet signature, the flow signature, the behavioral signature, and the alert signature.

\* \* \* \* \*